United States Patent
Liao et al.

(10) Patent No.: US 10,185,771 B2
(45) Date of Patent: Jan. 22, 2019

(54) METHOD AND SYSTEM FOR SCHEDULING WEB CRAWLERS ACCORDING TO KEYWORD SEARCH

(71) Applicants: BEIJING JINGDONG SHANGKE INFORMATION TECHNOLOGY CO., LTD., Haidian District, Beijing (CN); BEIJING JINGDONG CENTURY TRADING CO., LTD., Beijing (CN)

(72) Inventors: Yaohua Liao, Beijing (CN); Xiaowei Li, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 318 days.

(21) Appl. No.: 15/110,564

(22) PCT Filed: Jan. 9, 2015

(86) PCT No.: PCT/CN2015/070475
§ 371 (c)(1),
(2) Date: Jul. 8, 2016

(87) PCT Pub. No.: WO2015/103997
PCT Pub. Date: Jul. 16, 2015

(65) Prior Publication Data
US 2016/0328475 A1    Nov. 10, 2016

(30) Foreign Application Priority Data

Jan. 9, 2014  (CN) .......................... 2014 1 0011079

(51) Int. Cl.
G06F 17/30 (2006.01)
G06F 9/48 (2006.01)

(52) U.S. Cl.
CPC ...... *G06F 17/30864* (2013.01); *G06F 9/4881* (2013.01); *G06F 17/3089* (2013.01); *G06F 17/30117* (2013.01)

(58) Field of Classification Search
CPC ............. G06F 9/4881; G06F 17/30117; G06F 17/3089; G06F 17/30; G06F 9/48;
(Continued)

(56) References Cited

U.S. PATENT DOCUMENTS 6,691,108 B2   2/2004   Li
7,454,430 B1   11/2008  Komissarchik et al.
(Continued)

FOREIGN PATENT DOCUMENTS

| CN | 102646129 A | 8/2012 |
| CN | 103279492   | 9/2013 |
| CN | 103761279 A | 4/2014 |

OTHER PUBLICATIONS

International Search Report for Application No. PCT/CN2015/070475 dated Apr. 13, 2015 (11 pages).

*Primary Examiner* — Anh Ly
(74) *Attorney, Agent, or Firm* — Michael Best & Friedrich LLP (57) ABSTRACT

A method and a system for scheduling web crawlers according to keyword search. The method comprises: a scheduling end receiving a task request command sent by a crawling node; the scheduling end acquiring a secondary download link address from a priority bucket, generating tasks, adding the generated tasks into a task list, acquiring keyword link addresses from a dynamic bucket, deriving derivative link addresses of the quantities of pages corresponding to the keyword link addresses, generating tasks of the quantities of
(Continued)

the pages according to the derivative link addresses of the quantities of the pages, adding the tasks of the quantities of the pages into the task list, acquiring a keyword link address from a basic bucket, generating tasks, adding the generated tasks into the task list, and the scheduling end returning the task list to the crawling node. By adjusting the quantities of the tasks allowed to be added from a virtual bucket, the quantities of scheduled link addresses of different types are flexibly adjusted. In addition, by crawling popular keywords more frequently, data miss is prevented, and repeated crawls of unpopular keywords is reduced.

12 Claims, 5 Drawing Sheets

(58) Field of Classification Search
CPC ......... G06F 17/30864; G06F 17/30292; G06F 17/30595; G06F 17/30342
See application file for complete search history.

(56) References Cited

U.S. PATENT DOCUMENTS

| | | | | |
|---|---|---|---|---|
| 2007/0283425 | A1* | 12/2007 | Ture | G06F 17/30864 726/5 |
| 2009/0254512 | A1* | 10/2009 | Broder | G06F 17/30864 707/E17.119 |
| 2010/0082626 | A1* | 4/2010 | Tsai | G06F 17/30699 707/737 |
| 2012/0036580 | A1* | 2/2012 | Gorny | H04L 63/1433 726/25 |
| 2012/0072232 | A1* | 3/2012 | Frankham | G16H 10/20 705/2 |
| 2013/0144858 | A1* | 6/2013 | Lin | G06F 17/30864 707/709 |
| 2013/0212638 | A1* | 8/2013 | Wilson | H04L 63/20 726/1 |
| 2013/0226898 | A1* | 8/2013 | Brawer | G06F 17/30864 707/709 |

* cited by examiner

METHOD AND SYSTEM FOR SCHEDULING WEB CRAWLERS ACCORDING TO KEYWORD SEARCH

CROSS-REFERENCE TO RELATED APPLICATIONS

This application is a national stage filing under 35 U.S.C. 371 of International Application No. PCT/CN2015/070475 filed Jan. 9, 2015, and claims the foreign priority benefits of Chinese Patent Application No. 201410011079.8 filed Jan. 9, 2014, which are incorporated by reference herein in their entireties.

TECHNICAL FIELD

The present invention relates to the technical field concerning web crawlers, in particular a method and a system for scheduling web crawlers according to a keyword search.

BACKGROUND ART

Web crawlers based on a keyword search are the basis for acquiring keyword information. However, information update would cause cases of repeated or incomplete crawls of web crawlers, especially in target websites where information updates rather frequently, e.g., microblog websites such as Sina Microblog and search websites such as Baidu, etc. For popular keywords, it would be difficult for web crawlers to get a complete crawl of data therefor due to rather rapid information update, whereas for unpopular keywords, information is crawled repeatedly due to relatively slow information update.

In existing practice, different popular levels are set for keywords, and then keywords are crawled according to the popular levels thereof so that keywords with higher popular levels are crawled more frequently.

However, the existing practice has the following defects: (1) it is necessary to acquire the popular level for each keyword and then set the crawl frequency according to the popular level; and (2) many requests for secondary download link addresses are involved in an initial request process, and the existing scheme does not distinguish them.

SUMMARY OF INVENTION

In view of the above, it is necessary to provide a method and a system for scheduling web crawlers according to a keyword search to solve the technical problem that the crawl frequency is inaccurate due to necessity in pre-determining the popular level for a keyword in the existing art where a crawl frequency is set via setting the popular level for a keyword.

A method for scheduling web crawlers according to a keyword search, characterized in comprising:

Step 12 of a scheduling end receiving a task request command sent by a crawling node;

Step 13 of the scheduling end acquiring a secondary download link address from a priority bucket that stores secondary download link addresses, generating tasks, adding the generated tasks into a task list, and if the quantities allowed to be added into the task list from the priority bucket are reached, performing Step (16), and otherwise performing Step (14), wherein the secondary download link addresses are link addresses that need secondary download acquired from analysis of crawled pages crawled by the crawling node according to the task in the task list;

Step 14 of the scheduling end acquiring keyword link addresses from a dynamic bucket that stores keyword multipage link addresses, deriving derivative link addresses of the quantities of pages corresponding to the keyword link addresses, generating tasks of the quantities of the pages according to the derivative link addresses of the quantities of the pages, adding the tasks of the quantities of the pages into the task list, and if the quantities allowed to be added into the task list from the dynamic bucket are reached, performing Step (16), and otherwise performing Step (15), wherein the keyword link addresses are link addresses of search result pages generated in a target website according to the keyword, and the search result pages corresponding to the keyword link addresses in the dynamic bucket are of the quantities of pages no less than a preset threshold for the quantities of the pages that is no less than 2;

Step 15 of the scheduling end acquiring a keyword link address from a basic bucket that stores the keyword link addresses, generating tasks, adding the generated tasks into the task list, and if the quantities allowed to be added into the task list from the basic bucket are reached, performing Step (16), wherein the keyword link addresses are link addresses of search result pages generated in a target website according to the keyword, and the search result pages corresponding to the keyword link addresses in the basic bucket are of the quantities of pages no less than a preset threshold for the quantities of the pages that is no less than 2; and Step 16 of the scheduling end returning the task list to the crawling node, the crawling node performing the task in the task list according to the received task list.

A system for scheduling web crawlers according to a keyword search, characterized in comprising a scheduling end, and at least one crawling node that communicates with the scheduling end, the scheduling end comprising:
a task request command receiving module for receiving a task request command sent by the crawling node;
a priority bucket task generation module for acquiring a secondary download link address from a priority bucket that stores secondary download link addresses, generating tasks, and adding the generated tasks into a task list, and if the quantities allowed to be added into the task list from the priority bucket are reached, a task list returning module is executed, and otherwise a dynamic bucket task generation module is executed, wherein the secondary download link addresses are link addresses that need secondary download acquired from analysis of crawled pages crawled by the crawling node according to the task in the task list,
a dynamic bucket task generation module for acquiring keyword link addresses from a dynamic bucket that stores keyword multipage link addresses, deriving derivative link addresses of the quantities of pages corresponding to the keyword link addresses, generating tasks of the quantities of the pages according to the derivative link addresses of the quantities of the pages, adding the tasks of the quantities of the pages into the task list, and if the quantities allowed to be added into the task list from the dynamic bucket are reached, the task list returning module is executed, and otherwise the dynamic bucket task generation module is executed, wherein the keyword link addresses are link addresses of search result pages generated in a target website according to the keyword, and the search result pages corresponding to the keyword link addresses in the dynamic bucket are of the quantities of pages no less than a preset threshold for the quantities of the pages that is no less than 2,  a basic bucket task generation module for acquiring a keyword link address from a basic bucket that stores the keyword link addresses, generating tasks, adding the generated tasks into the task list, and if the quantities allowed to be added into the task list from the basic bucket are reached, the task list returning module is executed, wherein the keyword link addresses are link addresses of search result pages generated in the target website according to the keyword, and the search result pages corresponding to the keyword link addresses in the basic bucket are of the quantities of pages no less than a preset threshold for the quantities of the pages that is no less than 2, and  the task list returning module for returning the task list to the crawling node;

and the crawling node comprising:

a task request command sending module for sending a task request command to the scheduling end, and  a task performing module for performing the task in the task list according to the received task list.

In the present invention, the Priority Bucket, Dynamic Bucket, and Basic Bucket are all virtual buckets. Virtual buckets with different priority levels are provided, and link addresses of different types are stored in the virtual buckets so that link addresses with relatively high popular levels are placed in virtual buckets with relatively high priority levels. By adjusting the quantities of tasks allowed to be added from each virtual bucket, the quantities of scheduled link addresses of different types are adjusted flexibly. Besides, the popular level of a link address is not set artificially but according to the actual quantities of pages crawled according to the link address so that popular keywords are crawled more frequently to avoid missing data, while repeated crawls of unpopular keywords are reduced.

DETAILED DESCRIPTION OF PREFERRED EMBODIMENTS

Figure 1:
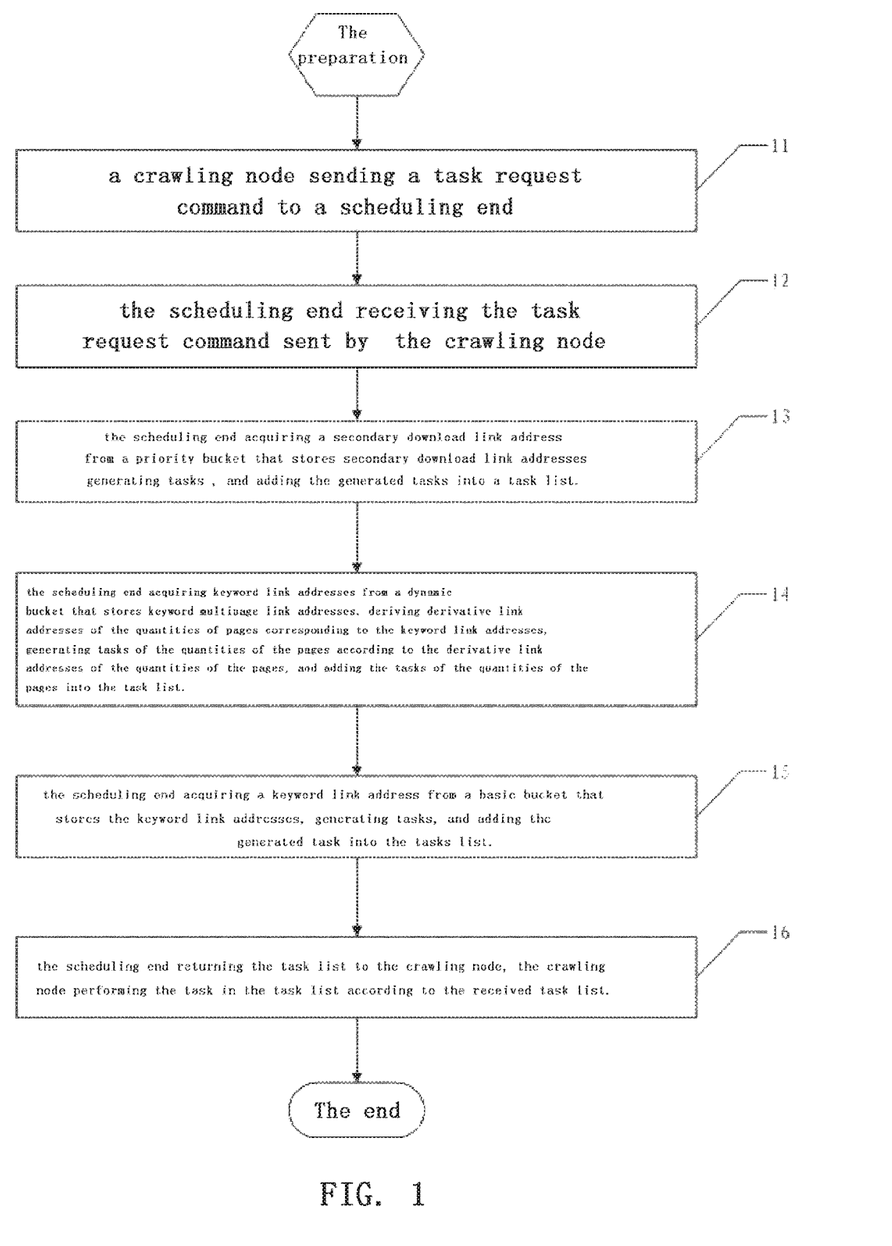
FIG. 1 is a flow chart of the method for scheduling web crawlers according to a keyword search according to the present invention.

The present invention is further depicted in details with reference to the drawings and specific embodiments below:

FIG. 1 illustrates the flow chart of the method for scheduling web crawlers according to a keyword search according to the present invention, the method comprising:

Step 11 of a crawling node sending a task request command to a scheduling end;

Step 12 of the scheduling end receiving the task request command sent by the crawling node;

Step 13 of the scheduling end acquiring a secondary download link address from a priority bucket that stores secondary download link addresses, generating tasks, adding the generated tasks into a task list, and if the quantities allowed to be added into the task list from the priority bucket are reached, performing Step (16), and otherwise performing Step (14), wherein the secondary download link addresses are link addresses that need secondary download acquired from analysis of crawled pages crawled by the crawling node according to the task in the task list;

Step 14 of the scheduling end acquiring keyword link addresses from a dynamic bucket that stores keyword multipage link addresses, deriving derivative link addresses of the quantities of pages corresponding to the keyword link addresses, generating tasks of the quantities of the pages according to the derivative link addresses of the quantities of the pages, adding the tasks of the quantities of the pages into the task list, and if the quantities allowed to be added into the task list from the dynamic bucket are reached, performing Step (16), and otherwise performing Step (15), wherein the keyword link addresses are link addresses of search result pages generated in a target website according to the keyword, and the search result pages corresponding to the keyword link addresses in the dynamic bucket are of the quantities of pages no less than a preset threshold for the quantities of the pages that is no less than 2;

Step 15 of the scheduling end acquiring a keyword link address from a basic bucket that stores the keyword link addresses, generating tasks, adding the generated tasks into the task list, and if the quantities allowed to be added into the task list from the basic bucket are reached, performing Step (16), wherein the keyword link addresses are link addresses of search result pages generated in the target website according to the keyword, and the search result pages corresponding to the keyword link addresses in the basic bucket are of the quantities of pages no less than a preset threshold for the quantities of the pages that is no less than 2; and  Step 16 of the scheduling end returning the task list to the crawling node, the crawling node performing the task in the task list according to the received task list.

In Step 13, processing is dedicated for secondary download link addresses. The secondary download link addresses are link addresses that need secondary download acquired from analysis of crawled pages crawled by crawling node according to the task in the task list. For example, when "Jingdong" is searched for in Baidu, a search result page including a plurality of search results will show with each search result corresponding to a link address, and the link address is the secondary download link address. Link addresses that need secondary download can be acquired from analysis of the crawled pages, and there have been relatively mature techniques for the analysis, which are not repeated herein.

In Steps 14 and 15, the keyword link addresses denote link addresses of search result pages generated in a target website according to the keyword. For example, when "Jingdong" is searched for in Baidu, a search result page generated according to the keyword "Jingdong" will show. If the keyword is a popular one, one search result page won't include all the search results, and the quantities of pages will show on the search page. The quantities of pages are used for indicating that there are search result pages of the quantities of the pages including the keyword. So the more the quantities of the pages are, the more popular the keyword is. So keyword link addresses with the quantities of pages exceeding a preset threshold for the quantities of pages are placed in dynamic bucket, and are processed with priority in Step 14. The judgment is made according to the actual quantities of pages, so the popular level of the keyword can be reflected more objectively.

The quantities allowed to be added from priority bucket denote the quantities of the secondary download link addresses in priority bucket allowed to be added into the task list, the quantities allowed to be added from dynamic bucket denote the quantities of the keyword link addresses in dynamic bucket allowed to be added into the task list, and the quantities allowed to be added from basic bucket denote the quantities of the keyword link addresses in basic bucket allowed to be added into the task list.

In one of the embodiments, the Step 13 specifically comprises:
  acquiring the secondary download link address from the priority bucket that stores secondary download link addresses;
  generating tasks;
  adding the generated tasks into the task list;
  deleting the secondary download link addresses, for which the task has been generated, from the priority bucket; and
  if the quantities allowed to be added into the task list from the priority bucket are reached, performing the Step 16,
  otherwise if the priority bucket further stores secondary download link addresses, performing the Step 13, and
  if all the secondary download link addresses have been deleted from the priority bucket, performing the Step 14.

In the embodiment, the secondary download link addresses are executed with priority, and deleted after being executed only once to avoid repeated crawls.

In one of the embodiments, the Step 14 specifically comprises:
  acquiring unscheduled keyword link addresses from the dynamic bucket that stores keyword link addresses;
  deriving the derivative link addresses of the quantities of the pages corresponding to the keyword link addresses;
  generating tasks of the quantities the pages according to the derivative link addresses of the quantities of the pages and adding the tasks into the task list;
  setting states of the keyword link addresses, for which the tasks have been generated, into scheduled; and
  if the quantities allowed to be added into the task list from the dynamic bucket are reached, performing the Step 16, and setting states of all the keyword link addresses in the dynamic bucket into unscheduled,
  otherwise if the dynamic bucket further stores unscheduled keyword link addresses, performing the Step 14, and
  if the dynamic bucket stores no unscheduled keyword link addresses, performing the Step 15.

In the embodiment, the keyword link addresses in dynamic bucket, as link addresses corresponding to popular keywords, will be recalled for multiple times so as to avoid miss of crawls of popular keywords.

In one of the embodiments, the basic bucket comprises an active bucket and a suspended bucket;
  the Step 15 specifically comprises:
  acquiring a keyword link address with the earliest scheduling time from the active bucket that stores the keyword link addresses, generating tasks, and adding the generated tasks into the task list, and
  increasing the scheduling times for keyword link addresses, for which the tasks have been generated, by a preset scheduling time increase and then moving them to the suspended bucket; and
  if the quantities allowed to be added into the task list from the basic bucket are reached, performing the Step 16,
  otherwise, if the active bucket further stores keyword link addresses, performing the Step 15, and
  if the active bucket stores no keyword link addresses, performing the Step 16.

In the embodiment, since the keyword link addresses in basic bucket are link addresses corresponding to unpopular keywords, it further configured such that basic bucket comprises an active bucket and a suspended bucket, wherein the link addresses in active bucket will be moved to suspended bucket after they are executed once and executed again at an interval by a scheduling time increase to avoid repeated crawls of unpopular keywords.

In one of the embodiments, the method further comprises:
  the crawling node crawling crawled pages according to the task in the task list, analyzing the crawled pages to acquire analysis data including the secondary download link addresses, information details, or quantities of the pages, and sending the analysis data to the scheduling end;
  the scheduling end receiving the analysis data:
  if the analysis data is the secondary download link addresses, placing the secondary download link addresses in the priority bucket;
  if the analysis data is the information details, placing the information details in a data bucket;
  if the analysis data is the quantities of the pages, adjusting the keyword link addresses corresponding to the quantities of the pages in the dynamic bucket and the basic bucket.

Different analysis data are placed in different virtual buckets to realize update of link addresses in the virtual buckets.

In one of the embodiments, the adjusting the keyword link addresses corresponding to the quantities of the pages in the dynamic bucket and the basic bucket by the scheduling end specifically comprises:
  setting the quantities of the pages currently received as new quantities of the pages, and setting the quantities of the pages previously received for the same keyword link addresses as old quantities of the pages; and
  if the old quantities of the pages are not consistent with the new quantities of the pages:
    if the old quantities of the pages are no less than the threshold for the quantities of the pages and the new quantities of the pages are no less than the threshold for the quantities of the pages, modifying the corresponding quantities of the pages corresponding to the keyword link addresses to the new quantities of the pages; or
    if the old quantities of the pages are no less than the threshold for the quantities of the pages and the new quantities of the pages are less than the threshold for the quantities of the pages, moving the corresponding keyword link addresses to the basic bucket; or if the old quantities of the pages are less than the threshold for the quantities of the pages and the new quantities of the pages are no less than the threshold for the quantities of the pages, moving the corresponding keyword link addresses to the dynamic bucket.

In the embodiment, it is further limited that the keyword link addresses corresponding to the quantities of the pages in dynamic bucket and basic bucket are adjusted according to comparison of old quantities of the pages and new quantities of the pages.

In one of the embodiments, the method comprises:
the crawling node crawling the crawled pages according to the task in the task list, analyzing the crawled pages to acquire analysis data including the secondary download link addresses, information details, or quantities of pages and sending the analysis data to the scheduling end;
the scheduling end receiving the analysis data:
if the analysis data is the secondary download link addresses, placing the secondary download link addresses in the priority bucket;
if the analysis data is the information details, placing the information details in the data bucket; and
if the analysis data is the quantities of the pages, setting the quantities of the pages currently received as new quantities of the pages, and setting the quantities of the pages previously received for the same keyword link addresses as old quantities of the pages, and if the old quantities of the pages are not consistent with the new quantities of the pages:
if the old quantities of the pages are no less than the threshold for the quantities of the pages and the new quantities of the pages are no less than the threshold for the quantities of the pages, modifying the corresponding quantities of the pages corresponding to the keyword link addresses to the new quantifies of the pages; or
if the old quantities of the pages are no less than the threshold for the quantities of the pages and the new quantities of the pages are less than the threshold for the quantities of the pages, moving the corresponding keyword link address to the active bucket; or
if the old quantities of the pages are less than the threshold for the quantities of the pages and the new quantities of the pages are no less than the threshold for the quantities of the pages, moving the corresponding keyword link address to the dynamic bucket; or
if the old quantities of the pages are less than the threshold for the quantities of the pages and the new quantities of the pages are less than the threshold for the quantities of the pages, searching the suspended bucket and moving the keyword link addresses, the scheduling times for which in the suspended bucket reach a current time, into the active bucket.

In the embodiment, it is further limited that the keyword link addresses corresponding to the quantities of the pages in the dynamic bucket and the basic bucket are adjusted according to comparison of old quantities of the pages and new quantities of the pages, and the suspended bucket are searched when appropriate to avoid the link addresses in the suspended bucket from being laid up for long time.

In one of the embodiments, the quantities allowed to be added from dynamic bucket are more than the quantities allowed to be added from basic bucket. By configuring such that the quantities allowed to be added from dynamic bucket are more than the quantities allowed to be added from basic bucket, more resources are used for crawling popular keywords.

Figure 2:
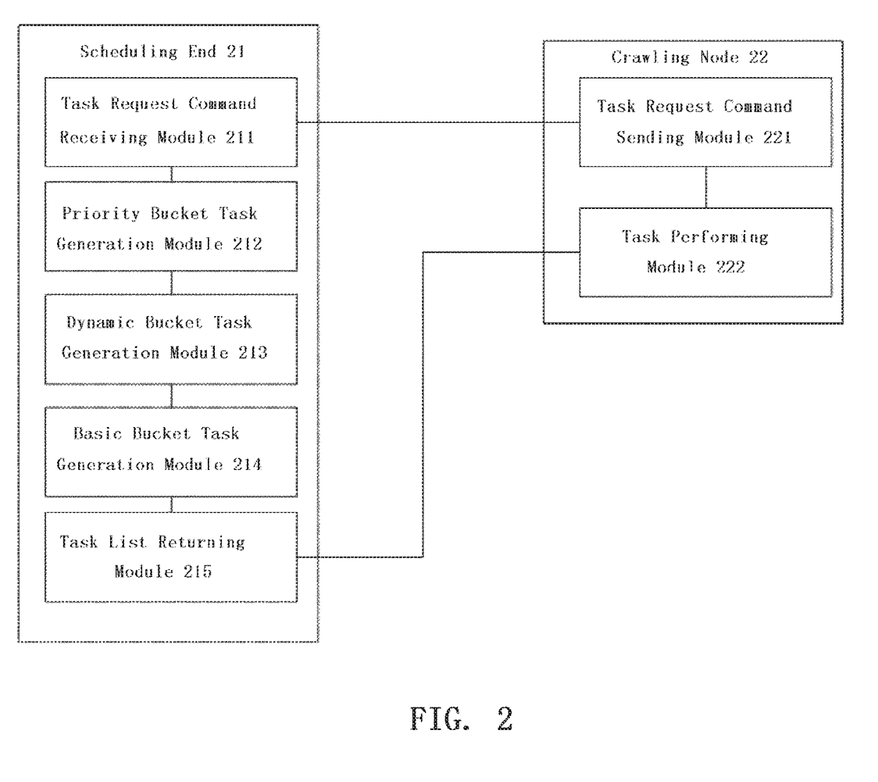
FIG. 2 is a schematic diagram of the modules of the system for scheduling web crawlers according to a keyword search according to the present invention.

FIG. 2 is a schematic diagram of the modules of the system for scheduling web crawlers according to a keyword search according to the present invention, characterized in the system comprising Scheduling End 21, and at least one Crawling Node 22 that communicates with Scheduling End 21, Scheduling End 21 comprising:
Task Request Command Receiving Module 211 for receiving a task request command sent by crawling node;
Priority Bucket Task Generation Module 212 for acquiring a secondary download link address from a priority bucket that stores secondary download link addresses, generating tasks, and adding the generated tasks into a task list, and if the quantities allowed to be added into the task list from the priority bucket are reached, a task list returning module is executed, and otherwise a dynamic bucket task generation module is executed, wherein the secondary download link addresses are link addresses that need secondary download acquired from analysis of crawled pages crawled by the crawling node according to the task in the task list;
Dynamic Bucket Task Generation Module 213 for acquiring keyword link addresses from a dynamic bucket that stores keyword multipage link addresses, deriving derivative link addresses of the quantities of pages corresponding to the keyword link addresses, generating tasks of the quantities of the pages according to the derivative link addresses of the quantities of the pages, adding the tasks of the quantities of the pages into the task list, and if the quantities allowed to be added into the task list from the dynamic bucket are reached, the task list returning module is executed, and otherwise the dynamic bucket task generation module is executed, wherein the keyword link addresses are link addresses of search result pages generated in a target website according to the keyword, and the search result pages corresponding to the keyword link addresses in the dynamic bucket are of the quantities of pages no less than a preset threshold for the quantities of the pages that is no less than 2;
Basic Bucket Task Generation Module 214 for acquiring a keyword link address from a basic bucket that stores the keyword link addresses, generating tasks, adding the generated tasks into the task list, and if the quantities allowed to be added into the task list from the basic bucket are reached, the task list returning module is executed, wherein the keyword link addresses are link addresses of search result pages generated in a target website according to the keyword, and the search result pages corresponding to the keyword link addresses in the basic bucket are of the quantities of pages no less than a preset threshold for the quantities of the pages that is no less than 2, and
Task List Returning Module 215 for returning the task list to the crawling node;
and Crawling Node 22 comprising:
Task Request Command Sending Module 221 for sending a task request command to the scheduling end, and Task Performing Module 222 for performing the task in the task list according to the received task list.

In one of the embodiments, Priority Bucket Task Generation Module 212 is specifically used for:
acquiring the secondary download link address from the priority bucket that stores secondary download link addresses,
generating tasks;
adding the generated tasks into the task list, and
deleting the secondary download link addresses, for which the task has been generated, from the priority bucket;
and
if the quantities allowed to be added into the task list from the priority bucket are reached, Task List Returning Module 215 is executed,
otherwise if the priority bucket further stores secondary download link addresses, Priority Bucket Task Generation Module 212 is executed, and
if all the secondary download link addresses have been deleted from the priority bucket, Dynamic Bucket Task Generation Module 213 is executed.

In one of the embodiments, Dynamic Bucket Task Generation Module 213 is specifically used for:
acquiring unscheduled keyword link addresses from the dynamic bucket that stores keyword link addresses;
deriving the derivative link addresses of the quantities of the pages corresponding to the keyword link addresses;
generating tasks of the quantities of the pages according to the derivative link addresses of the quantities of the pages and adding the tasks into the task list; and
setting states of the keyword link addresses, for which the tasks have been generated, into scheduled; and
if the quantities allowed to be added into the task list from the dynamic bucket are reached, Task List Returning Module 215 is executed, and states of all the keyword link addresses in the dynamic bucket are set into unscheduled,
otherwise if the dynamic bucket further stores unscheduled keyword link addresses, Dynamic Bucket Task Generation Module 213 is executed, and
if the dynamic bucket stores no unscheduled keyword link addresses, Basic Bucket Task Generation Module 214 is executed.

In one of the embodiments, the basic bucket comprises an active bucket and a suspended bucket; Basic Bucket Task Generation Module 214 is specifically used for:
acquiring a keyword link address with the earliest scheduling time from the active bucket that stores the keyword link addresses, generating tasks, and adding the generated tasks into the task list, and
increasing the scheduling times for the keyword link addresses, for which the tasks have been generated, by a preset scheduling time increase and then moving them to the suspended bucket; and
if the quantities allowed to be added into the task list from the basic bucket are reached, Task List Returning Module 215 is executed,
otherwise, if the active bucket further stores keyword link addresses, Basic Bucket Task Generation Module 214 is executed, and
if the active bucket stores no keyword link addresses, Task List Returning Module 215 is executed.

In one of the embodiments, Task Performing Module is specifically used for: crawling crawled pages according to the task in the task list, analyzing the crawled pages to acquire analysis data including the secondary download link addresses, information details, or quantities of the pages, and sending the analysis data to the scheduling end;
the scheduling end further comprises an analysis data receiving module for:
receiving the analysis data, and
if the analysis data is the secondary download link addresses, placing the secondary download link addresses in the priority bucket;
if the analysis data is the information details, placing the information details in a data bucket and
if the analysis data is the quantities of the pages, adjusting the keyword link addresses corresponding to the quantities of the pages in the dynamic bucket and the basic bucket.

In one of the embodiments, the adjusting the keyword link addresses corresponding to the quantities of the pages in the dynamic bucket and the basic bucket by the analysis data receiving module specifically comprises:
setting the quantities of the pages currently received as new quantities of the pages, and setting the quantities of the pages previously received for the same keyword link addresses as old quantities of the pages; and
if the old quantities of the pages are not consistent with the new quantities of the pages:
if the old quantities of the pages are no less than the threshold for the quantities of the pages and the new quantities of the pages are no less than the threshold for the quantities of the pages, modifying the corresponding quantities of the pages corresponding to the keyword link addresses to the new quantities of the pages, or
if the old quantities of the pages are no less than the threshold for the quantities of the pages and the new quantities of the pages are less than the threshold for the quantities of the pages, moving the corresponding keyword link addresses to the basic bucket, or
if the old quantities of the pages are less than the threshold for the quantities of the pages and the new quantities of the pages are no less than the threshold for the quantities of the pages, moving the corresponding keyword link address to the dynamic bucket.

In one of the embodiments, the task performing module is specifically used for:
crawling the crawled pages according to the task in the task list, analyzing the crawled pages to acquire analysis data including the secondary download link addresses, information details, or quantities of pages and sending the analysis data to the scheduling end;
and the scheduling end further comprises an analysis data receiving module used for:
receiving the analysis data, and
if the analysis data is the secondary download link addresses, placing the secondary download link addresses in the priority bucket;
if the analysis data is the information details, placing the information details in the data bucket; and
if the analysis data is the quantities of the pages, setting the quantities of the pages currently received as new quantities of the pages, setting the quantities of the pages previously received for the same keyword link addresses as old quantities of the pages, and if the old quantities of the pages are not consistent with the new quantities of the pages:
if the old quantities of the pages are no less than the threshold for the quantities of the pages and the new quantities of the pages are no less than the threshold for the quantities of the pages, modifying the corresponding quantities of the pages corresponding to the keyword link addresses to the new quantifies of the pages; or if the old quantities of the pages are no less than the threshold for the quantities of the pages and the new quantities of the pages are less than the threshold for the quantities of the pages, moving the corresponding keyword link addresses to the active bucket; or if the old quantities of the pages are less than the threshold for the quantities of the pages and the new quantities of the pages are no less than the threshold for the quantities of the pages, moving the corresponding keyword link addresses to the dynamic bucket; or if the old quantities of the pages are less than the threshold for the quantities of the pages and the new quantities of the pages are less than the threshold for the quantities of the pages, searching the suspended bucket, and moving the keyword link addresses, the scheduling times for which in the suspended bucket reach a current time, into the active bucket.

In one of the embodiments, the quantities allowed to be added from the dynamic bucket are more than the quantities allowed to be added from the basic bucket.

Figure 3:
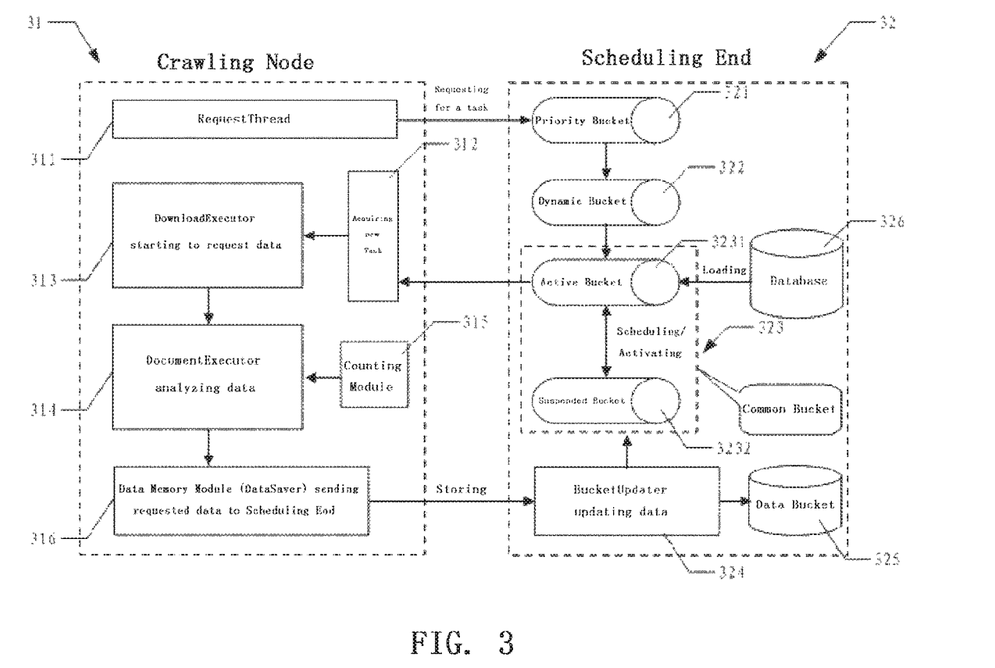
FIG. 3 is a schematic diagram of the structure of the system according to an example of the present invention.

FIG. 3 is a schematic diagram of the structure of the system according to an example of the present invention, the system comprising:

a thread request module 311, a task acquiring module 312, a download executor 313, a document executor 314, a counting module 315, and a data memory module 316 disposed at a crawling node 31; and a priority bucket 321, a dynamic bucket 322, a basic bucket 323, an active bucket 3231, a suspended bucket 3232, a bucket updater 324, a data bucket 325, and a database 326 disposed at a scheduling end 32.

In this example, a bucket scheduling and managing module (BucketScheduler) comprises priority bucket 321, dynamic bucket 322, and basic bucket 323. The secondary download link addresses returned by the crawling node are stored in priority bucket 321, and these URLs are deleted from the bucket after completion of scheduling. URLs composed of keywords in each website are stored in dynamic bucket 322, and these URLs will derive new URLs according to the results returned by the counting module. The derived URLs won't be stored, but will be scheduled along with the URLs in the dynamic bucket. URLs composed of keywords in each website are also stored in a common bucket, but do not derive new URLs. Common bucket 323 is categorized into two groups, i.e., active bucket 3231 and suspended bucket 3232. URLs in active bucket 3231 will be ranked according to the scheduling times, and URLs with earlier scheduling times will be scheduled earlier. By contrast, URLs in suspended bucket 3232 won't be scheduled. URLs in these two buckets will exchange with each other. Once the scheduling end receives a task request from the crawling node, the bucket scheduling and managing module will extract corresponding URLs from the buckets to construct a task to be sent to the crawling node. The rule for constructing a task is as follows: Assuming a task size is size=1000, the quantities of the URLs in the priority bucket (PriorityBucket) are priorityBucket=300, the quantities of the URLs in the dynamic bucket (DynamicBucket) are dynamicBucket=100 and average quantities of pages for each URL are page=5, and the quantities of the URLs in the common bucket (CommonBucket) are commonBucket=500, acquiring the URLs from the priority bucket first with a remaining size of the task being remainSize=700, and then acquiring the URLs from the dynamic bucket with the remaining size of the task being remainSize=700−100*5=200, and finally acquiring the URLs from the common bucket, and if the quantities of the URLs in the active bucket in the common bucket are no more than 200, constructing all these URLs into the task while adding all these URLs into the suspended bucket, and if the quantities of the URLs in the active bucket are more than 200, selecting the $1^{st}$ to $200^{th}$ URLs ranked in scheduling time to construct the task, and adding these URLs into the suspended bucket. If the schedulable times for URLs in the suspended bucket reach, they are moved to the active bucket.

Figure 4:
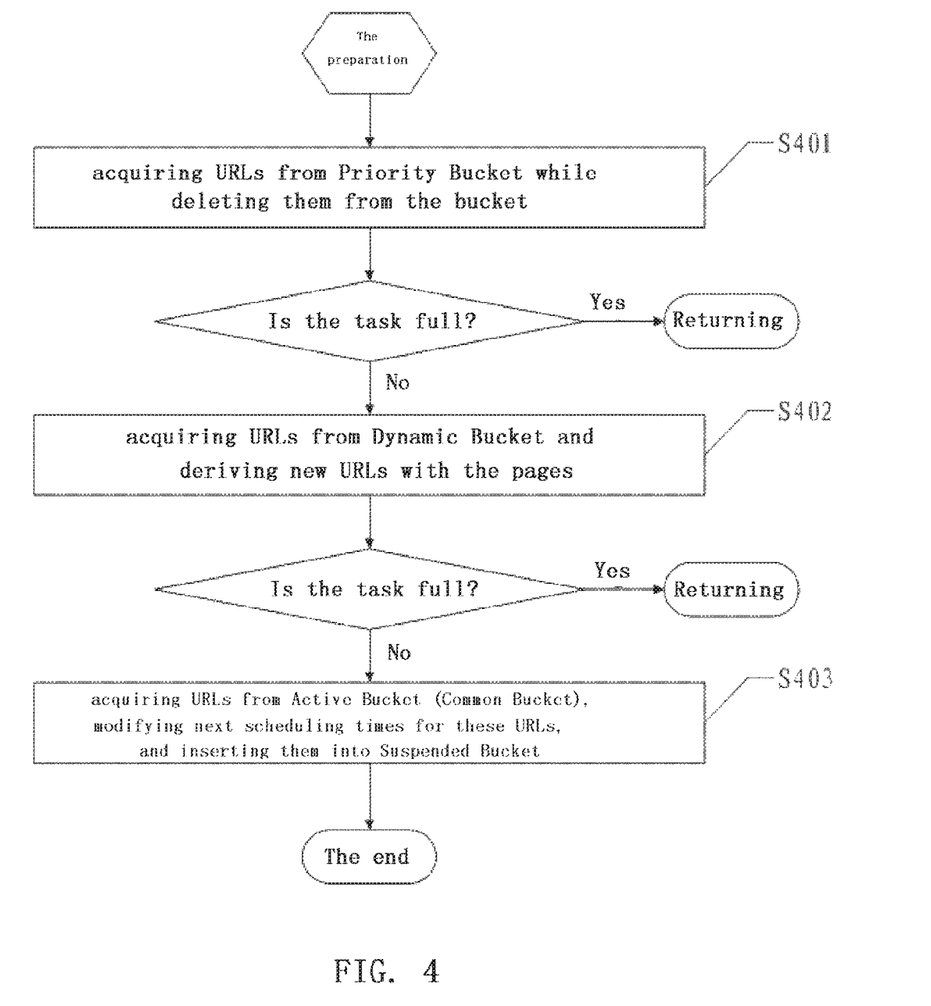
FIG. 4 is a flow chart of the bucket scheduler (bucket scheduling and managing module) according to an example of the present invention.

FIG. 4 is a flow chart of the bucket scheduling and managing module. In this example, the priorityBucket is the quantities allowed to be added from the priority bucket, the dynamicBucket×average quantities of pages for each URL is the quantities allowed to be added from the dynamic bucket, the task size−priorityBucket−dynamicBucket×average quantities of pages for each URL is the quantities allowed to be added from the basic bucket. As shown in FIG. 4, the method comprises:

Step S401 of acquiring URLs from the priority bucket while deleting them from the bucket, and returning if the task has been full, and otherwise performing Step S402;

Step S402 of acquiring URLs from the dynamic bucket and deriving new URLs with the pages, and returning if the task has been full, and otherwise performing Step S403;

Step S403 of acquiring URLs from the active bucket (common bucket), modifying next scheduling times for these URLs, and inserting them into the suspended bucket.

The counting module is disposed at the crawling end. The crawling node extracts the quantifies of pieces of information on a webpage and a time interval between the first piece of information and the last piece of information after data has been requested for, and transfers them to the counting module. Counting module calculates the quantities of pages that may be generated by the keyword within 30 minutes according to these data, and transfers these data to the scheduling end.

Figure 5:
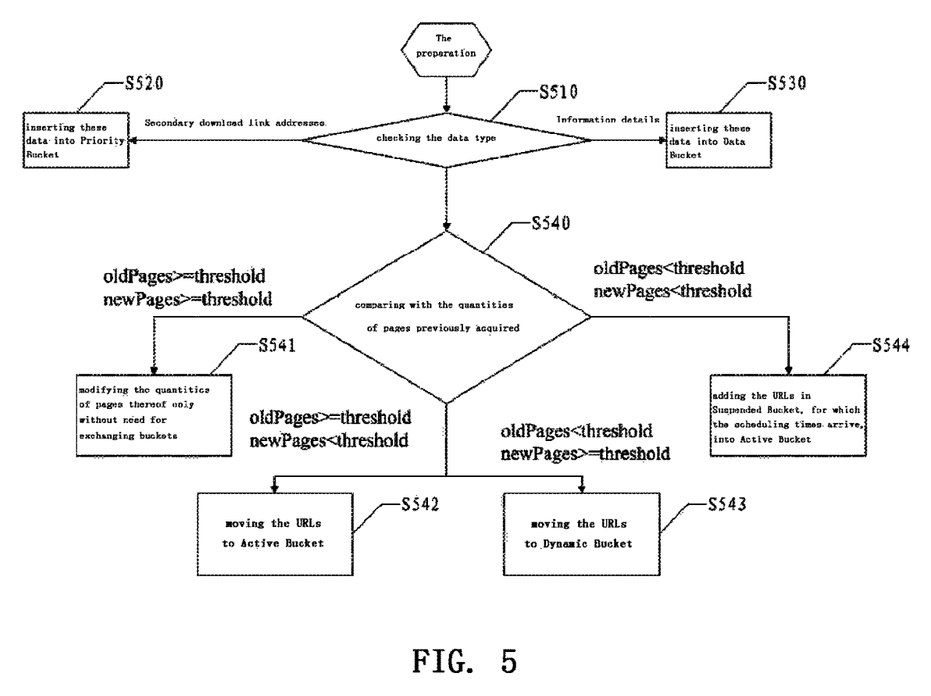
FIG. 5 is a flow chart of the bucket updater according to an example of the present invention

Bucket updater 324 (BucketUpdater) is disposed at scheduling end 32, and its main function is updating URLs in priority bucket 321, dynamic bucket 322, and basic bucket 323. The data extracted by crawling node 31 including secondary download link addresses, information details, and quantities of pages will all be transferred to bucket updater 324 at scheduling end 32. Bucket updater 324 will update different buckets according to types of these data after receiving these data. The specific process, as illustrated in FIG. 5, comprises:

Step S510 of checking the data type, performing Step S520 if the analyzed data is secondary download link addresses, performing Step S540 if the analyzed data is information details, and performing Step S540 if the analyzed data is quantities of pages;

Step S520 of inserting these data into the priority bucket (PriorityBucket) for scheduling by the scheduler;

Step S530 of inserting these data into the data bucket (DataBucket) for acquiring by a serving party;

Step S540 of comparing with the quantities of pages previously acquired, returning without any operations if the quantities of pages are the same; and if the quantities of pages are different:
    if old quantities of pages (oldPages) are no less than a threshold (the "threshold" may be set on one's own and is 3 in the scheme), i.e., oldPages>=threshold, and new quantities of pages (newPages) are also no less than the threshold, i.e., newPages>=threshold, performing Step S541;
    if oldPages>=threshold but newPages<threshold, performing Step S542;
    if oldPages<threshold but newPages>=threshold, performing Step S543;
    if oldPages<threshold but newPages<threshold, performing Step S544;
Step S541 of modifying the quantities of pages thereof only without need for exchanging buckets since the URLs are currently in the dynamic bucket;
Step S542 of moving the URLs to the active bucket since the URLs are currently in the dynamic bucket;
Step S543 of moving the URLs to the dynamic bucket since the URLs are currently in the common bucket; and
Step S544 of scanning the suspended bucket since the URLs are currently in the common bucket and even probably in the suspended bucket, and adding the URLs in the suspended bucket, for which the scheduling times arrive, into the active bucket.

The aforesaid embodiments only depict several modes of implementing the present invention, and are depicted in details, but cannot be construed to limit the patent scope of the present invention. It should be pointed out that an ordinary skilled person in the art may make multiple alterations and improvement without deviating from the concept of the present invention, and these all belong to the protection scope of the present invention. Therefore, the patent protection scope of the present invention shall be determined based on the attached claims.

The invention claimed is:

1. A method for scheduling web crawlers according to a keyword search, characterized in comprising:
    a step A of receiving a task request command;
    a step B of acquiring a secondary download link address from a first bucket that stores secondary download link addresses, generating a task for crawling the secondary download link address, adding the generated tasks into a task list, and if the quantities allowed to be added into the task list from the first bucket are reached, performing a step C, and otherwise performing a step D, wherein the secondary download link addresses from the first bucket are link addresses that need secondary download acquired from analysis of crawled pages according to the task in the task list;
    the step D of acquiring a keyword link address from a second bucket that stores keyword multipage link addresses, deriving derivative link addresses of each of a plurality of pages corresponding to the keyword link address, generating tasks of the plurality of pages according to the derivative link addresses of the plurality of pages, adding the tasks of the plurality of pages into the task list, and if the quantities allowed to be added into the task list from the second bucket are reached, performing the step C, and otherwise performing a step E, wherein each keyword multipage link address from the second bucket is a link address of search result pages generated in a target website according to the keyword, wherein a quantity of search result pages for each link address stored in the second bucket is no less than a preset threshold that is no less than 2;
    the step E of acquiring a keyword link address from a third bucket that stores keyword link addresses, generating tasks, adding the generated tasks into the task list, and if the quantities allowed to be added into the task list from the third bucket are reached, performing the step C, wherein the keyword link addresses from the third bucket are link addresses of search result pages generated in a target website according to the keyword;
    the step C of returning the task list to a web crawler, and the web crawler performing the task in the task list according to the received task list, wherein performing the task includes crawling a page according to the task, analyzing the page to acquire analysis data including the secondary download link addresses, information details, or a quantity of search result pages,
    if the analysis data is the secondary download link addresses, placing the secondary download link addresses in the first bucket;
    if the analysis data is the information details, placing the information details in a fourth bucket; and
    if the analysis data is the quantity of search result pages, adjusting the keyword link address corresponding to the search result pages in the second bucket and the third bucket, wherein adjusting the keyword link addresses corresponding to the search result pages in the second bucket and the third bucket specifically comprises:
        setting the quantity of the search result pages received in the analysis data as a new quantity of the search result pages, and setting the quantity of the search result pages previously received for the same keyword link address as an old quantity of the search result pages; and
        if the old quantity of the search result pages is not consistent with the new quantity of the search result pages:
            if the old quantity of the search result pages is no less than the preset threshold and the new quantity of the search result pages is no less than the preset threshold, modifying the corresponding quantity of the pages corresponding to the keyword link address to the new quantity of the search result pages; or
            if the old quantity of the search result pages is no less than the preset threshold and the new quantity of the search result pages is less than the preset threshold, moving the corresponding keyword link address to the third bucket; or
            if the old quantity of the search result pages is less than the preset threshold and the new quantity of the search result pages is no less than the preset threshold, moving the corresponding keyword link address to the second bucket.

2. The method for scheduling web crawlers according to a keyword search according to claim 1, characterized in that the step B specifically comprises:
    acquiring the secondary download link address from the first bucket that stores secondary download link addresses;
    generating tasks;
    adding the generated tasks into the task list;

deleting the secondary download link addresses, for which the task has been generated, from the first bucket; and if the quantities allowed to be added into the task list from the first bucket are reached, performing the step C, otherwise if the first bucket further stores secondary download link addresses, performing the step B, and if all the secondary download link addresses have been deleted from the first bucket, performing the step D.

3. The method for scheduling web crawlers according to a keyword search according to claim 1, characterized in that the step D specifically comprises:

acquiring unscheduled keyword link addresses from the second bucket that stores keyword link addresses;

deriving the derivative link addresses of the plurality of pages corresponding to the keyword link addresses;

generating tasks of the plurality of pages according to the derivative link addresses of the plurality of pages and adding the tasks into the task list;

setting states of the keyword link addresses, for which the tasks have been generated, to scheduled; and if the quantities allowed to be added into the task list from the second bucket are reached, performing the step C, and setting states of all the keyword link addresses in the second bucket to unscheduled, otherwise if the second bucket further stores unscheduled keyword link addresses, performing the step D, and if the second bucket stores no unscheduled keyword link addresses, performing the step E.

4. The method for scheduling web crawlers according to a keyword search according to claim 1, characterized in that the third bucket comprises an active bucket and a suspended bucket;

the step E specifically comprises:

acquiring a keyword link address with the earliest scheduling time from the active bucket that stores the keyword link addresses, generating tasks, and adding the generated tasks into the task list;

increasing the scheduling times for keyword link addresses, for which the tasks have been generated, by a preset scheduling time increase and then moving them to the suspended bucket; and if the quantities allowed to be added into the task list from the third bucket are reached, performing the step C, otherwise, if the active bucket further stores keyword link addresses, performing the step E, and if the active bucket stores no keyword link addresses, performing the step C.

5. The method for scheduling web crawlers according to a keyword search according to claim 1, characterized in that the quantities allowed to be added from the second bucket are more than the quantities allowed to be added from the third bucket.

6. A system for scheduling web crawlers according to a keyword search, characterized in comprising a scheduling end, and at least one web crawler that communicates with the scheduling end, the scheduling end comprising:

a task request command receiving module for receiving a task request command sent by the web crawler;

a first bucket task generation module for acquiring a secondary download link address from a first bucket that stores secondary download link addresses, generating tasks, and adding the generated tasks into a task list, and if the quantities allowed to be added into the task list from the first bucket are reached, a task list returning module is executed, and otherwise a second bucket task generation module is executed, wherein the secondary download link addresses from the first bucket are link addresses that need secondary download acquired from analysis of crawled pages crawled by the web crawler according to the task in the task list;

the second bucket task generation module for acquiring a keyword link address from a second bucket that stores keyword multipage link addresses, deriving derivative link addresses of a plurality of pages corresponding to the keyword link address, generating tasks of the plurality of pages according to the derivative link addresses of the plurality of pages, adding the tasks of the plurality of pages into the task list, and if the quantities allowed to be added into the task list from the second bucket are reached, the task list returning module is executed, and otherwise a third bucket task generation module is executed, wherein the keyword link addresses from the second bucket are link addresses of a plurality of search result pages generated in a target web site according to the keyword, wherein a quantity of search result pages for each link address stored in the second bucket is no less than a preset threshold that is no less than 2;

the third bucket task generation module for acquiring a keyword link address from a third bucket that stores keyword link addresses, generating tasks, adding the generated tasks into the task list, and if the quantities allowed to be added into the task list from the third bucket are reached, the task list returning module is executed, wherein the keyword link addresses from the third bucket are link addresses of search result pages generated in a target website according to the keyword; and the task list returning module for returning the task list to the web crawler; and the web crawler comprising:

the task request command sending module for sending a task request command to the scheduling end; and a task performing module for performing at least one task in the list according to the received task list, wherein the task performing module is specifically used for:

crawling pages according to the at least one the task in the list, analyzing the crawled pages to acquire analysis data including the secondary download link addresses, information details, or a quantity of search result pages, and sending the analysis data to the scheduling end; and the scheduling end further comprises an analysis data receiving module for receiving the analysis data, wherein the analysis data receiving module is specifically used for:

if the analysis data is the secondary download link addresses, placing the secondary download link addresses in the first bucket, if the analysis data is the information details, placing the information details in a fourth bucket, and if the analysis data is the quantity of the search result pages, adjusting the keyword link address corresponding to the search result pages in the second bucket and the third bucket, wherein adjusting the keyword link address corresponding to the search result pages in the second bucket and the third bucket by the analysis data receiving module specifically comprises:

setting the quantity of the search result pages received in the analysis data as a new quantity of the search result pages, and setting the quantity of the search result pages previously received for the same keyword link address as an old quantity of the search result pages; and if the old quantity of the search result pages is not consistent with the new quantity of the search result pages:

if the old quantity of the search result pages is no less than the preset threshold and the new quantity of the search result pages is no less than the preset threshold, modifying the corresponding quantity of the pages corresponding to the keyword link address to the new quantity of the search result pages; or if the old quantity of the search result pages is no less than the preset threshold and the new quantity of the search result pages is less than the preset threshold, moving the corresponding keyword link address to the third bucket; or if the old quantity of the search result pages is less than the preset threshold and the new quantity of the search result pages is no less than the preset threshold, moving the corresponding keyword link address to the second bucket.

7. The system for scheduling web crawlers according to a keyword search according to claim 6, characterized in that:
the first bucket task generation module is specifically used for:

acquiring the secondary download link address from the first bucket that stores secondary download link addresses, generating tasks, adding the generated tasks into the task list, and deleting the secondary download link addresses, for which the task has been generated, from the first bucket; and if the quantities allowed to be added into the task list from the first bucket are reached, the task list returning module is executed, otherwise if the first bucket further stores secondary download link addresses, the first bucket task generation module is executed, and if all the secondary download link addresses have been deleted from the first bucket, the second bucket task generation module is executed.

8. The system for scheduling web crawlers according to a keyword search according to claim 6, characterized in that:
the second bucket task generation module is specifically used for:

acquiring unscheduled keyword link addresses from the second bucket that stores keyword link addresses;

deriving the derivative link addresses of the plurality of pages corresponding to the keyword link addresses;

generating tasks of the plurality of pages according to the derivative link addresses of the plurality of pages and adding the tasks into the task list; and setting states of the keyword link addresses, for which the tasks have been generated, to scheduled; and if the quantities allowed to be added into the task list from the second bucket are reached, the task list returning module is executed, and states of all the keyword link addresses in the second bucket are set into unscheduled, otherwise if the second bucket further stores unscheduled keyword link addresses, the second bucket task generation module is executed, and if the second bucket stores no unscheduled keyword link addresses, the third bucket task generation module is executed.

9. The system for scheduling web crawlers according to a keyword search according to claim 6, characterized in that:
the third bucket comprises an active bucket and a suspended bucket;
the third bucket task generation module is specifically used for:

acquiring a keyword link address with the earliest scheduling time from the active bucket that stores the keyword link addresses, generating tasks, and adding the generated tasks into the task list; and increasing the scheduling times for the keyword link addresses, for which the tasks have been generated, by a preset scheduling time increase and then moving them to the suspended bucket; and if the quantities allowed to be added into the task list from the third bucket are reached, the task list returning module is executed, otherwise, if the active bucket further stores keyword link addresses, the third bucket task generation module is executed, and if the active bucket stores no keyword link addresses, the task list returning module is executed.

10. The system for scheduling web crawlers according to a keyword search according to claim 6, characterized in that the quantities allowed to be added from the second bucket are more than the quantities allowed to be added from the third bucket.

11. A method for scheduling web crawlers according to a keyword search, characterized in comprising:

a step A of receiving a task request command;

a step B of acquiring a secondary download link address from a first bucket that stores secondary download link addresses, generating a task for crawling the secondary download link address, adding the generated tasks into a task list, and if the quantities allowed to be added into the task list from the first bucket are reached, performing a step C, and otherwise performing a step D, wherein the secondary download link addresses from the first bucket are link addresses that need secondary download acquired from analysis of crawled pages according to the task in the task list;

the step D of acquiring a keyword link address from a second bucket that stores keyword multipage link addresses, deriving derivative link addresses of each of a plurality of pages corresponding to the keyword multipage link address, generating tasks of the plurality of pages according to the derivative link addresses of the plurality of pages, adding the tasks of the plurality of pages to the task list, and if the quantities allowed to be added into the task list from the second bucket are reached, performing the step C, and otherwise performing a step E, wherein each keyword multipage link address from the second bucket is a link address of search result pages generated in a target web site according to the keyword, wherein a quantity of search result pages for each link address stored in the second bucket is no less than a preset threshold that is no less than 2;

the step E of acquiring a keyword link address from a third bucket that stores keyword link addresses, generating tasks, adding the generated tasks into the task list, and if the quantities allowed to be added into the task list from the third bucket are reached, performing the step C, wherein the keyword link addresses from the third bucket are link addresses of search result pages generated in a target web site according to the keyword, characterized in that the third bucket comprises an active bucket and a suspended bucket and the step E specifically comprises:

acquiring a keyword link address with the earliest scheduling time from the active bucket that stores the keyword link addresses, generating tasks, and adding the generated tasks into the task list;

increasing the scheduling times for keyword link addresses, for which the tasks have been generated, by a preset scheduling time increase and then moving them to the suspended bucket; and if the quantities allowed to be added into the task list from the third bucket are reached, performing the step C, otherwise, if the active bucket further stores keyword link addresses, performing the step E, and if the active bucket stores no keyword link addresses, performing the step C;

the step C of returning the task list to a web crawler, and the web crawler performing the task in the task list according to the received task list, wherein performing the task includes crawling a page according to the task, analyzing the page to acquire analysis data including the secondary download link addresses, information details, or a quantity of search result pages;

if the analysis data is the secondary download link addresses, placing the secondary download link addresses in the first bucket;

if the analysis data is the information details, placing the information details in a fourth bucket; and if the analysis data is the quantity of search result pages, setting the quantity of the search result pages received in the analysis data as a new quantity of the search result pages, and setting the quantity of the search result pages previously received for the same keyword link address as an old quantity of the search result pages; and if the old quantity of the search result pages is not consistent with the new quantity of the search result pages:

if the old quantity of the search result pages is no less than the preset threshold and the new quantity of the search result pages is no less than the preset threshold, modifying the corresponding quantity of the pages corresponding to the keyword link address to the new quantity of the search result pages; or if the old quantity of the search result pages is no less than the preset threshold and the new quantity of the search result pages is less than the preset threshold, moving the corresponding keyword link address to the active bucket of the second bucket; or if the old quantity of the search result pages is less than the preset threshold and the new quantity of the search result pages is no less than the preset threshold, moving the corresponding keyword link address to the second bucket; or if the old quantity of the search result pages is less than the preset threshold and the new quantity of the search result pages is less than the preset threshold, searching the suspended bucket of the second bucket and moving the keyword link address, the scheduling times for which in the suspended bucket reach a current time, into the active bucket.

12. A system for scheduling web crawlers according to a keyword search, characterized in comprising a scheduling end, and at least one web crawler that communicates with the scheduling end, the scheduling end comprising:

a task request command receiving module for receiving a task request command sent by the web crawler;

a first bucket task generation module for acquiring a secondary download link address from a first bucket that stores secondary download link addresses, generating tasks, and adding the generated tasks into a task list, and if the quantities allowed to be added into the task list from the first bucket are reached, a task list returning module is executed, and otherwise a second bucket task generation module is executed, wherein the secondary download link addresses from the first bucket are link addresses that need secondary download acquired from analysis of crawled pages crawled by the web crawler according to the task in the task list;

the second bucket task generation module for acquiring a keyword link address from a second bucket that stores keyword multipage link addresses, deriving derivative link addresses of a plurality of pages corresponding to the keyword link address, generating tasks of the plurality of pages according to the derivative link addresses of the plurality of pages, adding the tasks of the plurality of pages into the task list, and if the quantities allowed to be added into the task list from the second bucket are reached, the task list returning module is executed, and otherwise a third bucket task generation module is executed, wherein the keyword link addresses from the second bucket are link addresses of a plurality of search result pages generated in a target web site according to the keyword, wherein a quantity of search result pages for each link address stored in the second bucket is no less than a preset threshold that is no less than 2;

the third bucket task generation module for acquiring a keyword link address from a third bucket that stores keyword link addresses, generating tasks, adding the generated tasks into the task list, and if the quantities allowed to be added into the task list from the third bucket are reached, the task list returning module is executed, wherein the keyword link addresses from the third bucket are link addresses of search result pages generated in a target web site according to the keyword; and the task list returning module for returning the task list to the web crawler; and the web crawler comprising:

the task request command sending module for sending a task request command to the scheduling end; and a task performing module for performing at least one task in the task list according to the received task list, characterized in that:

the third bucket comprise an active bucket and a suspended bucket;

the third bucket task generation module is specifically used for:
  acquiring a keyword link address with the earliest scheduling time from the active bucket that stores the keyword link addresses, generating tasks, and adding the generated tasks into the task list, and increasing the scheduling times for the keyword link addresses, for which the tasks have been generated, by a preset scheduling time increase and then moving them to the suspended bucket; and
  if the quantities allowed to be added into the task list from the third bucket are reached, the task list returning module is executed, otherwise, if the active bucket further stores keyword link addresses, the third bucket task generation module is executed, and if the active bucket stores no keyword link addresses, the task list returning module is executed,
the task performing module is specifically used for:
  crawling a page according to the task in the task list, analyzing the page to acquire analysis data including the secondary download link addresses, information details, or a quantity of search result pages and sending the analysis data to the scheduling end; and
the scheduling end further comprises an analysis data receiving module used for
  receiving the analysis data;
  if the analysis data is the secondary download link addresses, placing the secondary download link addresses in the first bucket;
  if the analysis data is the information details, placing the information details in a fourth bucket; and
  if the analysis data is the quantity of search result pages, setting the quantity of the search result pages received in the analysis data as a new quantity of the search result pages, and setting the quantity of search result pages previously received for the same keyword link address as an old quantity of the search result pages:
    if the old quantity of the search result pages is no less than the preset threshold and the new quantity of the search result pages is no less than the preset threshold, modifying the corresponding quantity of the search result pages corresponding to the keyword link address to the new quantity of the search result pages; or
    if the old quantity of the search result pages are no less than the preset threshold and the new quantity of the search result pages is less than the preset threshold, moving the corresponding keyword link address to the active bucket; or
    if the old quantity of the search result pages is less than the preset threshold and the new quantity of the search result pages is no less than the preset threshold, moving the corresponding keyword link address to the second bucket; or
    if the old quantity of the search result pages is less than the preset threshold and the new quantity of the search result pages is less than the preset threshold, searching the suspended bucket, and moving the keyword link address, the scheduling times for which in the suspended bucket reach a current time, into the active bucket.

\* \* \* \* \*